United States Patent [19]

Norton et al.

[11] 4,134,750

[45] Jan. 16, 1979

[54] GRANULAR AMMONIUM PHOSPHATE SULFATE AND UREA-AMMONIUM PHOSPHATE SULFATE USING A COMMON PIPE-CROSS REACTOR

[75] Inventors: Melvin M. Norton, Sheffield; Byron R. Parker, Florence, both of Ala.

[73] Assignee: Tennessee Valley Authority, Muscle Shoals, Ala.

[21] Appl. No.: 861,585

[22] Filed: Dec. 19, 1977

Related U.S. Application Data

[63] Continuation of Ser. No. 818,602, Jul. 25, 1977, now Defensive Publication No. T 969,002.

[51] Int. Cl.² .................... C05B 7/00; C05C 9/00; C01B 25/28
[52] U.S. Cl. .................................. 71/29; 71/37; 71/64 DA; 423/313
[58] Field of Search .......... 71/29, 34, 37, 43, 64 DA, 71/36, 28; 23/259.2, 259.3; 423/313, 305, 315

[56] References Cited

U.S. PATENT DOCUMENTS

| | | | |
|---|---|---|---|
| 2,945,747 | 7/1960 | Nielsson | 71/37 X |
| 3,419,378 | 12/1968 | Kearns | 71/43 X |
| 3,540,874 | 11/1970 | Stinson | 71/29 |
| 3,578,433 | 5/1971 | Bottai et al. | 71/34 X |
| 3,825,414 | 7/1974 | Lee et al. | 71/34 X |
| 3,954,942 | 5/1976 | Achorh et al. | 71/43 X |

Primary Examiner—Kenneth M. Schor

Attorney, Agent, or Firm—Robert A. Petrusek

[57] ABSTRACT

A process for the production of fertilizers from phosphoric and sulfuric acids, anhydrous ammonia, and urea, and more specifically, the production of high-analysis granular ammonium phosphates, ammonium phosphate sulfates, and urea-ammonium phosphate sulfates—some with polyphosphate contents of up to 68 percent of the total $P_2O_5$. A specially designed pipe-cross reactor is used to produce a homogeneous melt or slurry of low moisture content from the reactants and thus eliminates the need for a preneutralizer as used in many prior-art granular fertilizer processes. In addition, because of the low melt or slurry moisture content, the dryer (also used in most of the previous processes) is eliminated. The elimination of these two items greatly simplifies pollution abatement, since both items are sources of fumes and dust. The equipment used to produce granular monoammonium phosphate, diammonium phosphate, urea-ammonium phosphate sulfate, and ammonium phosphate sulfate fertilizers is uncomplicated, relatively inexpensive, and simple to operate. The products produced are dust-free and of such particle size that they are well suited for bulk blends. Ammonium phosphate sulfate grades of 12-48-0, 6-24-24, 13-13-13, 10-40-10, a monoammonium phosphate grade of 11-55-0, a diammonium phosphate and diammonium phosphate sulfate grade of 18-46-0, and urea-ammonium phosphate sulfate grades of 33-11-0, 17-17-17, and 20-10-10 have been produced with this process.

8 Claims, 7 Drawing Figures

FLOWSHEET OF THE GRANULATION PILOT-PLANT FOR PRODUCTION OF GRANULAR FERTILIZER USING PIPE-CROSS REACTOR

Fig. 2

FLOWSHEET OF THE GRANULATION PILOT-PLANT FOR PRODUCTION OF UREA – AMMONIUM PHOSPHATE SULFATE FERTILIZER USING PIPE-CROSS REACTOR

PIPE-CROSS REACTOR WITH 1½ INCH REACTION TUBE

Fig. 3

EXPOSURE-PENETRATION TESTS

Fig. 6

EXPOSURE-PENETRATION TESTS

Fig. 7

GRANULAR AMMONIUM PHOSPHATE SULFATE AND UREA-AMMONIUM PHOSPHATE SULFATE USING A COMMON PIPE-CROSS REACTOR

The invention herein described may be manufactured and used by or for the Governmental purposes without the payment to us of any royalty therefor.

This application is a continuation of application Ser. No. 818,602 filed July 25, 1977 and now Defensive Publication No. T969,002.

Our invention relates to an improvement in the production of fertilizers from phosphoric acid, sulfuric acid, and ammonia; and more particularly it relates to improved processes for the production of high-analysis granular ammonium phosphates, ammonium phosphate sulfates, and urea-ammonium phosphate sulfates, some with polyphosphate contents up to 68 percent of the total $P_2O_5$.

Ammonium phosphate sulfates, ammonium phosphates, and urea-ammonium phosphate sulfates are effective for fertilizer use because of their favorable physical properties, high concentration of plant foods, and because they provide an economical method of fixing ammonia in a solid form. These fertilizer materials are attractive because they are multinutrient materials that have been shown by greenhouse tests as very effective sources of plant nutrient nitrogen and phosphorus pentoxide, and in the instance of ammonium phosphate sulfates and urea-ammonium phosphate sulfates, sulfur. Agronomic data show ammonium phosphate sulfates are particularly suited for use in alkaline soils and also on acid soils when their residual acidity is neutralized.

Monoammonium phosphate has been produced commercially in the United States, Canada, and European countries, such as England and Spain, from ammonia and wet-process phosphoric acid by processes that were developed by the Imperial Chemical Industries of England and the Scottish Agricultural Industries of Scotland; however, products produced by both of these processes are nongranular and are dusty and, for this reason, are impractical for use as a direct application material or for the production of bulk blends. Products produced by our process will be dust free and of such particle size distribution that they are well suited for the production of bulk blends and direct application.

In many processes for granulation of mixed fertilizer previously known to the art, such as those taught in U.S. Pat. No. 2,926,079, Smith, and U.S. Pat. No. 2,798,801, Kieffer et al, a drying step is required to remove excess moisture. The process of the present invention eliminates the need for a drying step. The process of the instant invention also eliminates the need for a pressurization step as well as the requirement for special equipment, such as a dehydration chamber, as taught in U.S. Pat. No. 3,415,638, Hamsley et al.

In U.S. Pat. No. 3,153,574, Achorn and Young disclose a process for the manufacture of diammonium phosphate from wet-process phosphoric acid and ammonia; however, this process requires a preneutralization step using a large preneutralizer tank. A principal advantage of our process is that the requirement of the preneutralization step and the large preneutralizer tank has been eliminated. In addition, our process eliminates the need for a separate step to dry the solid ammonium phosphate products, except in perhaps special cases where very dilute feed phosphoric and sulfuric acids, such as less than 40 percent $P_2O_5$ phosphoric acid and less than 78 percent sulfuric acids, are used.

Elimination of the expensive and difficult drying step is important in decreasing investment, energy requirements, and operating costs. Pollution abatement is greatly simplified since the greatest source of fumes and dust is eliminated.

In U.S. Pat. No. 2,902,342, Kerley et al, a process is described for the production of ammonium phosphate sulfate. However, in Kerley's process, both a complicated acid preparation and a first ammoniation step are required. The first ammoniation step is quite similar to the preneutralization step described by Achorn and Young, supra. A primary objective of our invention is to eliminate these extra steps and the complicated and expensive equipment. We have discovered that this can be accomplished by using a specially designed pipe-cross reactor to carry out the neutralization of the acids.

In U.S. Pat. No. 3,985,538, Hicks and Lancaster disclose a process for the production of granular ammonium polyphosphate fertilizer in which the ammonium polyphosphate melt is prepared in a pipe reactor and dispersed through a series of holes in the wall of the pipe to bind small particles of fertilizer into granules. However, a preneutralization step is required. This step is also quite similar to the preneutralization step described by Achorn and Young, supra. Our invention eliminates this step and the extra reaction, transfer, and metering equipment required. In the above-mentioned invention, Hicks and Lancaster fed urea as a solid when producing urea-ammonium phosphate grades to prevent decomposition and hydrolysis of the urea. The process as taught in U.S. Pat. No. 3,825,414, Lee and Meline, showed that in order to add the urea as a concentrated solution, it was necessary to separate the points of entry of the urea solution and the molten ammonium polyphosphate stream of the two streams upstream from one another by at least 12 inches to prevent subsequent reaction of the said urea and ammonium polyphosphate. Although urea can be fed as a solid in our process, we have discovered that a urea solution can be added (by use of the pipe-cross reactor to produce an ammonium phosphate sulfate melt) in close proximity to the molten ammonium phosphate sulfate; in several cases, the urea has been fed to the pipe-cross reactor to produce a homogeneous molten spray of urea-ammonium phosphate sulfate.

Prior art arrangements in the processes of the above-mentioned types have proved to be operative; however, such processes require the expenditure of substantial amounts of capital for such relatively expensive equipment as large preneutralization tanks and acid preparation tanks, along with their associated piping, transfer, and metering equipment. In addition, the processes shown in the prior art produced only ammonium phosphates or ammonium phosphate sulfates. In our process, all three materials (diammonium phosphate, monoammonium phosphate, and ammonium phosphate sulfate) and urea-ammonium phosphate sulfate can be produced.

Our invention is directed to an improved process for producing high-analysis granular ammonium phosphate, ammonium phosphate sulfate, and/or urea-ammonium phosphate sulfate materials in relatively inexpensive equipment that can be installed inside of a conventional rotary TVA type ammoniator-granulator. The TVA ammoniator-granulator is described in U.S Pat. No. 2,729,554, Nielsson. Nielsson also teaches a process for ammoniating superphosphate and is not concerned with the production of monoammonium phosphate, diammonium phosphate, or ammonium phosphate sulfate by the reaction of phosphoric acid, sulfuric acid, and ammonia. Nielsson's process gives good results when ammoniated superphosphate is the desired product, but it cannot be used for the production of granular diammonium phosphate, monoammonium phosphate, or ammonium phosphate sulfates in that direct introduction of ammoniating fluids and phosphoric acid into the rotating drum would result in the formation of a slurry, and not the formation of strong, granular ammonium phosphate and/or ammonium phosphate sulfate as taught by our invention.

In U.S. Pat. No. 3,954,942, Achorn and Lewis describe a process using the pipe-cross reactor to produce ammonium phosphate and ammonium phosphate sulfate. This process requires the use of an aqueous ammonium medium to neutralize the acids introduced to the pipe-cross reactor. Our process eliminates the requirement of an aqueous ammoniating medium to be used as a feed to the pipe-cross reactor and thus allows the use of more dilute feed acids than previously taught. This realizes further savings of fuel cost for acid concentration. Our invention also allows products with high polyphosphate contents to be produced since anhydrous ammonia is used instead of an aqueous ammonia medium. In addition, our invention allows production of urea-ammonium phosphate sulfate by feeding solid urea or a highly concentrated urea solution to the granulator or by feeding a highly concentrated urea solution to the pipe-cross reactor. None of the products produced by our process require a separate drying step, as taught by most of the processes in the prior art.

We have overcome the difficulties inherent in apparatus and processes of the type described in the prior art to a substantial extent in our present invention by using anhydrous ammonia and eliminating the steps of preneutralization and by providing an addition to the inclined drum shown in Nielsson, supra. The addition is a pipe-cross reactor which is installed inside the ammoniator-granulator. Gaseous anhydrous ammonia is reacted with phosphoric acid and sulfuric acid or with only phosphoric acid in this pipe cross. In the diammonium phosphate process described by Achorn, supra, a preneutralization step is required and slurry from the preneutralizer must be pumped into the ammoniator-granulator. Since the slurry must be pumped, it cannot be of low moisture content because it is impossible to pump such a slurry containing less than 15 percent moisture at temperatures of 240° F. and below.

Most slurries from preneutralizers using the Achorn process, supra, have a moisture content of about 20 percent. We have now found that by using our new invention (pipe cross and vaporization tube), it is possible to discharge the partially reacted sulfuric acid, phosphoric acid, and ammonia directly into the ammoniator-granulator. For this reason, discharge from our new pipe-cross reactor can be either anhydrous or of low moisture which could not previously be pumped; therefore, less water would be introduced into the ammoniator-granulator. Our test results show that if the moisture introduction in the production of ammonium phosphate and ammonium phosphate sulfate can be minimized, higher production rates can be realized. Test results show that the production rate of the ammonium phosphate is indirectly proportional to the moisture content of the slurry from the preneutralizers or first ammoniation step. Since this reactor is installed inside the granulation equipment and will discharge directly onto the surface of the bed of granules in the ammoniator-granulator, it is possible to have little or no moisture in the partially neutralized melt or slurry.

Several new and advantageous features of our process over conventional art processes are realized in the present invention. Among the advantageous features are:

1. The equipment required for the practice of our invention is simple, economical, and very easy to operate.

2. The heat of chemical reaction is utilized to evaporate water from the phosphoric and sulfuric acids prior to introducing them to the bed of granular materials in the ammoniator-granulator. Efficient utilization of this chemical heat results in a recycle requirement that is significantly lower than in many other processes for the production of granular diammonium phosphate, monoammonium phosphate, or ammonium phosphate sulfate.

3. Other processes for the production of granular diammonium phosphate, monoammonium phosphate, ammonium phosphate sulfate, and urea-ammonium phosphate sulfate require fuel to dry the products from the ammoniator-granulator. Product from the ammoniator-granulator in our process is of low enough moisture and high enough temperature that it can be sufficiently dried during cooling so that a product with low enough moisture for satisfactory storage will result. Therefore, our process eliminates the heretofore required drying equipment, whereas most of the processes in the prior art do require this type of equipment.

4. In our process, gaseous ammonia is used and the chemical heat of the neutralization reaction in the pipe-cross reactor vaporizes both free water and some chemically bound water to produce an anhydrous melt or a highly concentrated slurry containing some $P_2O_5$ in the polyphosphate form. With our process, the polyphosphate content in the diammonium phosphate product is only about 1 to 2 percent because a low slurry temperature and a granulator product discharge temperature are maintained to keep the free ammonia evolution rates from the ammoniator-granulator low. With other materials produced, the polyphosphate content of the product was more than 5 percent and as high as 68 percent in some cases.

5. The spraying of hot melt (or slurry) from our pipe-cross reactor into the granulator decreases the amount of dust lost from the granulator.

6. By prereacting all of the sulfuric acid in our pipe-cross reactor instead of reacting it in the bed of the granulator, the amount of ammonium chloride fumes (pollutant) formed in the granulator can be kept to a minimum.

7. By reacting the phosphoric acid in the pipe-cross reactor, and in some cases, part of it in the ammoniator-granulator, and thus eliminating the need of a preneutralization step with a preneutralizer tank, the quantity of fluorine evolved from the process is significantly reduced. This eliminates all or part of the fluorine scrubber and its associated piping, metering, pumping, and transfer equipment.

Another advantage of the present invention is the elimination of equipment such as preneutralizer slurry meters, slurry pumps, and expensive transfer lines. Since our pipe-cross reactor discharges directly into the ammoniator-granulator, this expensive equipment is not required.

In carrying out the objects of our invention in one form thereof, a rotating drum apparatus similar in design to that taught in Nielsson, supra, is used. We have found this drum-granulation technique and equipment to be the most economical and best for continuous mixing, ammoniation, and granulation. In addition, we have discovered that if we can employ a pipe-cross reactor which is installed inside such an ammoniator-granulator and is used to partially neutralize the phosphoric acid and sulfuric acid with gaseous ammonia, a granular product having highly desirable physical and chemical characteristics may be withdrawn from the lower end of the drum.

This invention, together with further objects and advantages thereof, will be better understood from a consideration of the following description taken in connection with the accompanying drawings in which.

Figure 1:
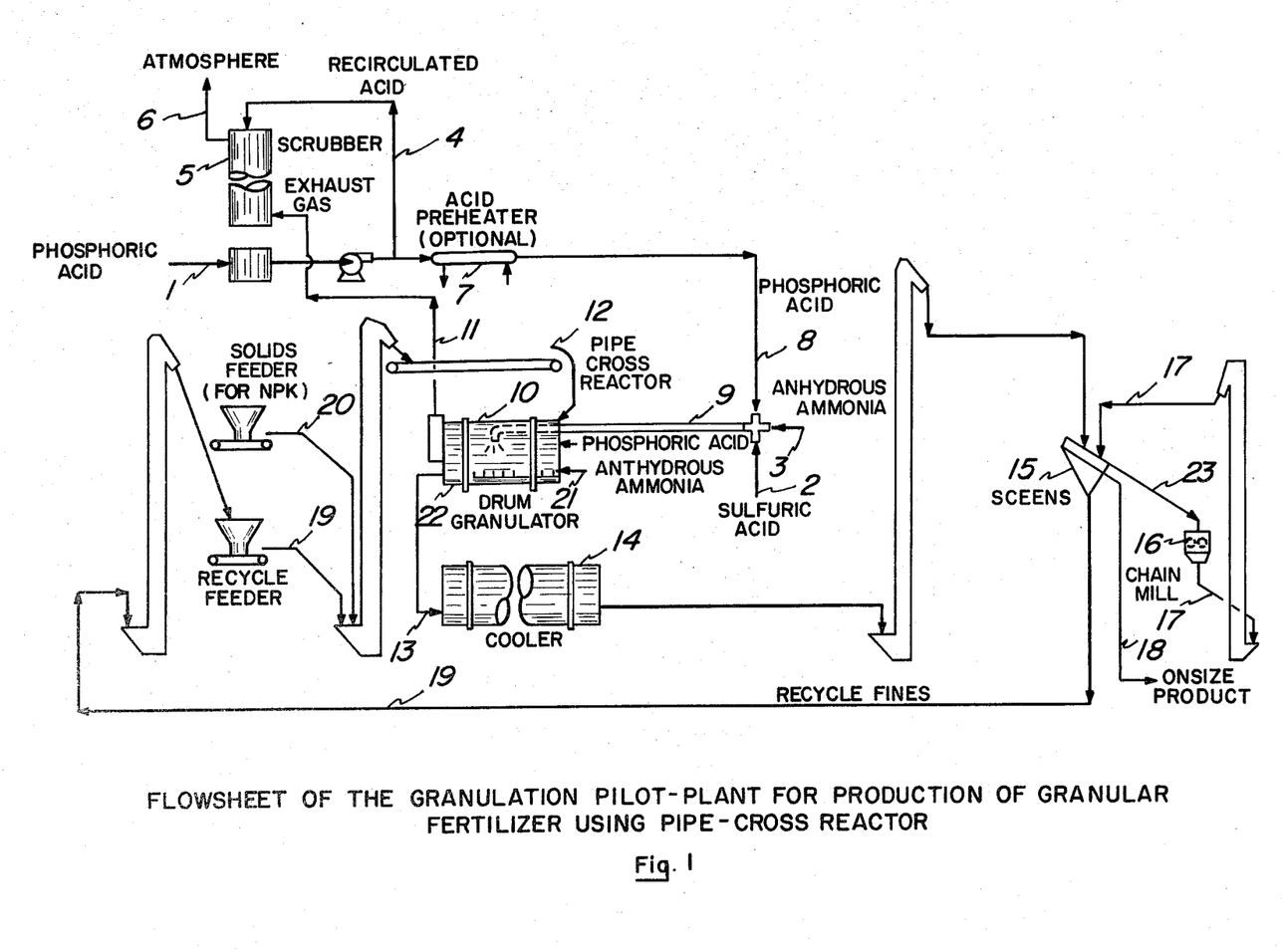
FIG. 1 is a flowsheet illustrating the principal novel process which results in an ammonium phosphate (either monoammonium phosphate or diammonium phosphate) or ammonium phosphate sulfate mixtures. In this flowsheet, the pipe-cross reactor is equipped to use gaseous ammonia.

Referring now specifically to FIG. 1, a stream of phosphoric acid 1 is introduced into scrubber 5 where it is recirculated via line 4. Water vapor 6 is discharged to the atmosphere. A side stream of phosphoric acid 8 is heated, if desired, by optional heat exchanger 7 and fed into one branch of pipe-cross reactor 9. Sulfuric acid 2 is fed into another branch of pipe-cross reactor 9. The two acids mix and are contacted by either liquid or gaseous anhydrous ammonia 3 being introduced into the third branch of pipe-cross reactor 9. The two acids react with the anhydrous ammonia to form either an anhydrous melt or a highly concentrated solution of ammonium phosphate sulfate. These reactants discharge from pipe-cross reactor 9 into granulator 10:

Where they can be further reacted with anhydrous ammonia 21 using a conventional submerged sparger 22, Where they can contact a bed of recycled solids 12, and Where they can contact other solid feed materials 20 when producing NPK grades, such as sulfate of ammonia, single or triple superphosphate, and potassium chloride, or other sources of potassium.

Off-gases 11 from granulator 10 are routed through scrubber 5 for removal of ammonia and particulates. The granular solids 13 are routed through cooler 14 then to screen 15 where they are sized. The oversize 23 is crushed in crusher 16 and rescreened 17. The undersize 19 is recycled to granulator 10. The onsize 18 is sent to storage.

Figure 2:
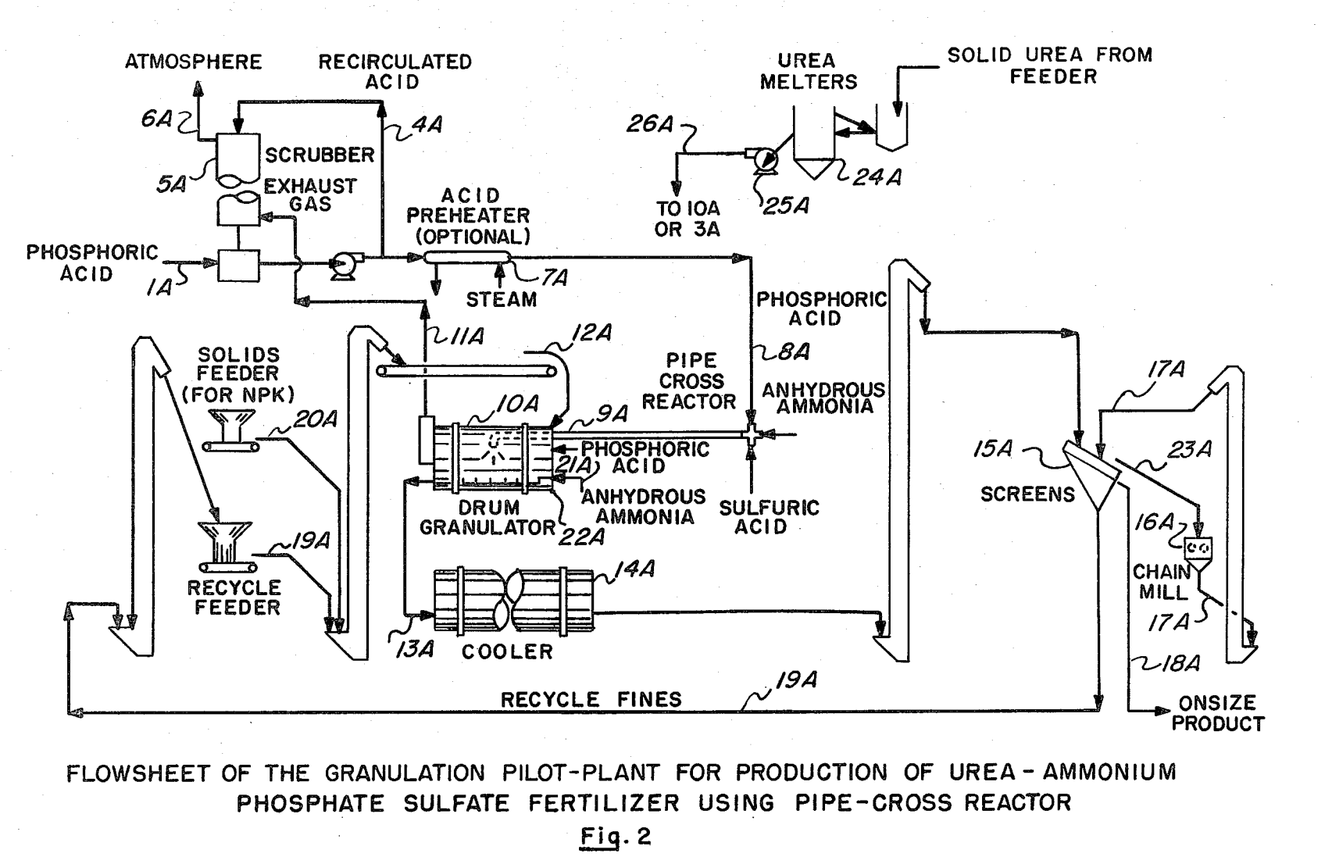
FIG. 2 is a flowsheet illustrating the principal novel process which results in a urea-ammonium phosphate sulfate mixture.

Referring specifically to FIG. 2, when a urea-ammonium phosphate sulfate material is produced, the preceding scheme applies except that, in addition, urea is fed to the process either:

(a) As a solid through solids feed system 20A, to recycle stream 12A, and then to ammoniator-granulator 10A;

(b) As a solid to the urea melters 24A, where it is melted using high-pressure steam inside a jacket and/or coils, and this urea melt or highly concentrated solution pumped by centrifugal pump 25A through a jacketed line and sprayed onto the granulator bed through a hollow-cone spray nozzle;

(c) As a solid to above-mentioned urea melters 24A where it is melted and pumped as a melt or highly concentrated solution to pipe-cross reactor 9A where it is introduced into the ammonia sparger along with the gaseous ammonia 3A; or (d) As a melt or concentrated solution to locations in (b) and (c) above.

Figure 3:
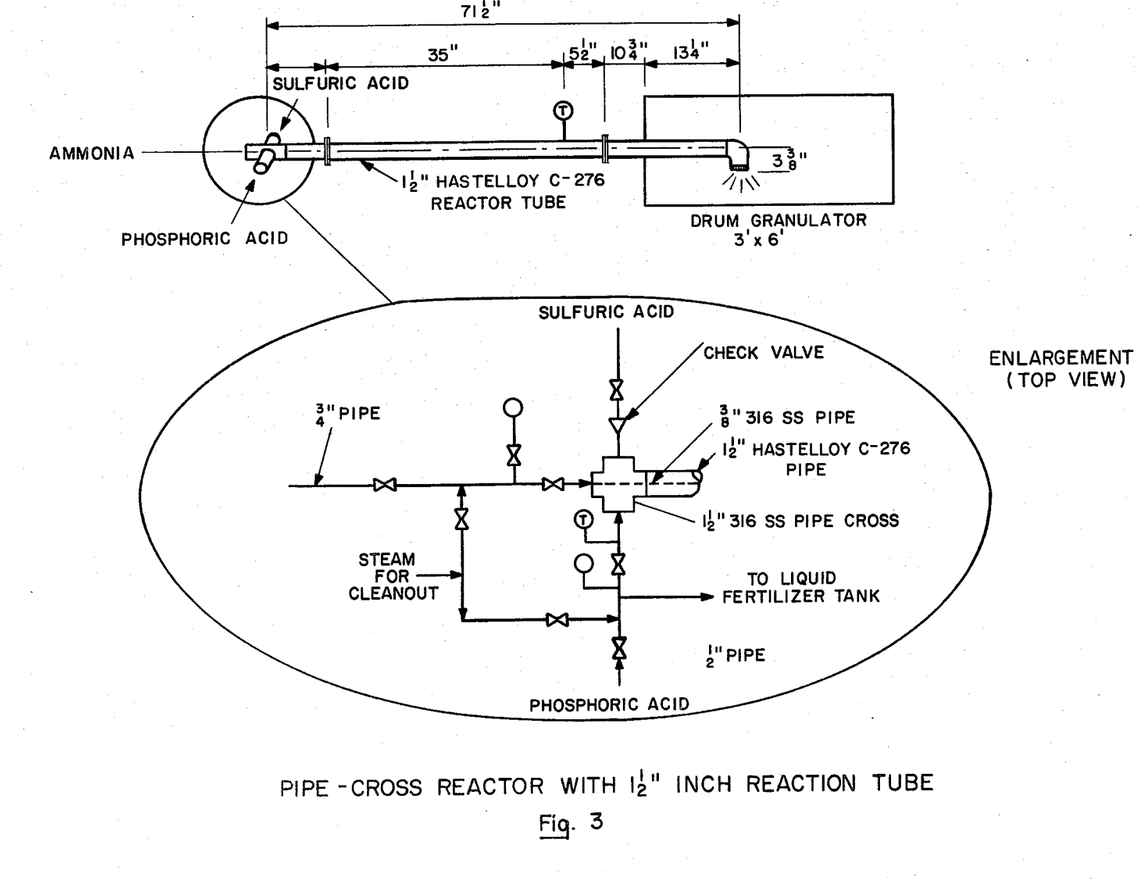
FIG. 3 shows a sketch of our pilot-scale pipe-cross reactor which uses a 1½-inch reaction tube that is made of Hastelloy C-276 metal.
Figure 4:
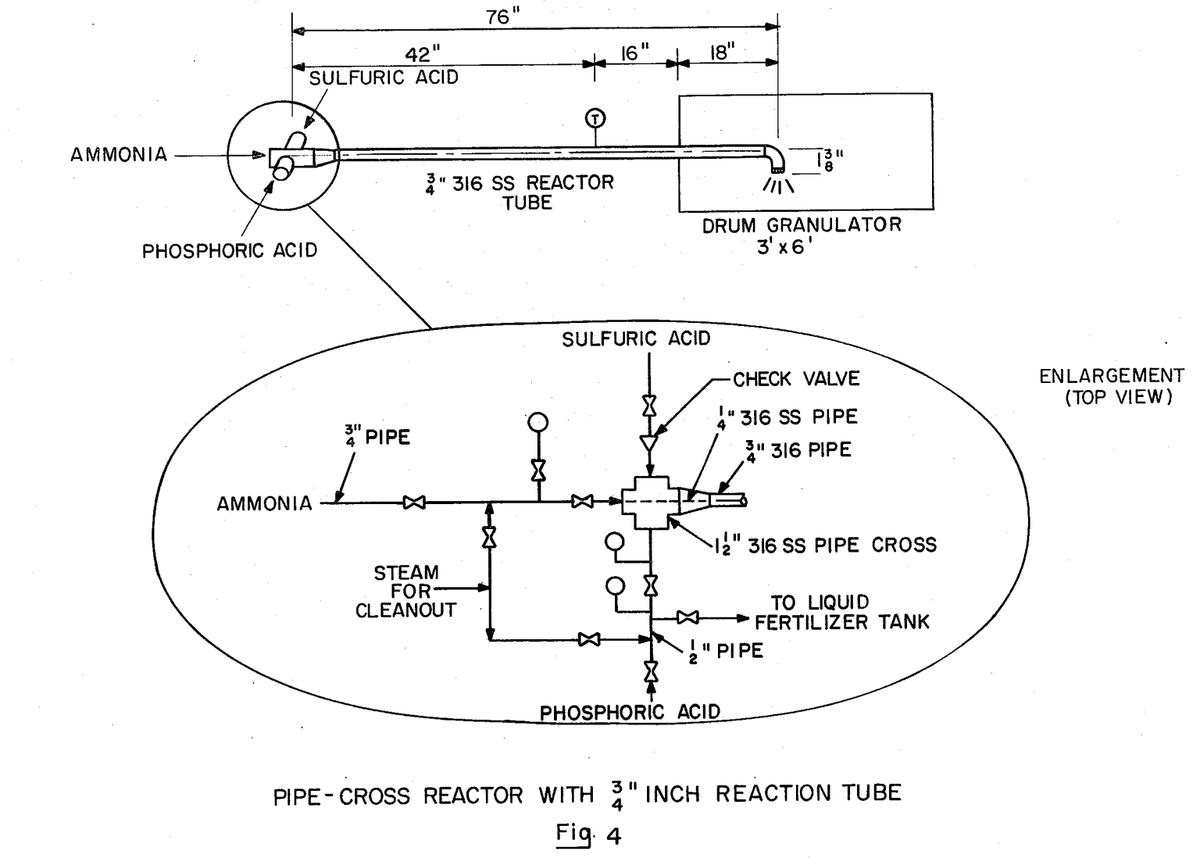
FIG. 4 shows a sketch of our pilot-scale pipe-cross reactor which has been modified to give higher unit throughput rates by installing a ¾-inch reaction tube made of 316 stainless steel metal. Although this reaction tube was made of 316 stainles steel because of the short time in which it was needed and the long delivery of a Hastelloy C-276 pipe, the recommended reaction tube material of construction should be Hastelloy C-276 or Hastelloy C-4. The corrosion rate of the 316 stainless steel tube was excessive, as the first reaction tube lasted only 169 hours of operation. A second 316 stainless steel tube lasted only 85 hours of operation.
Figure 5:
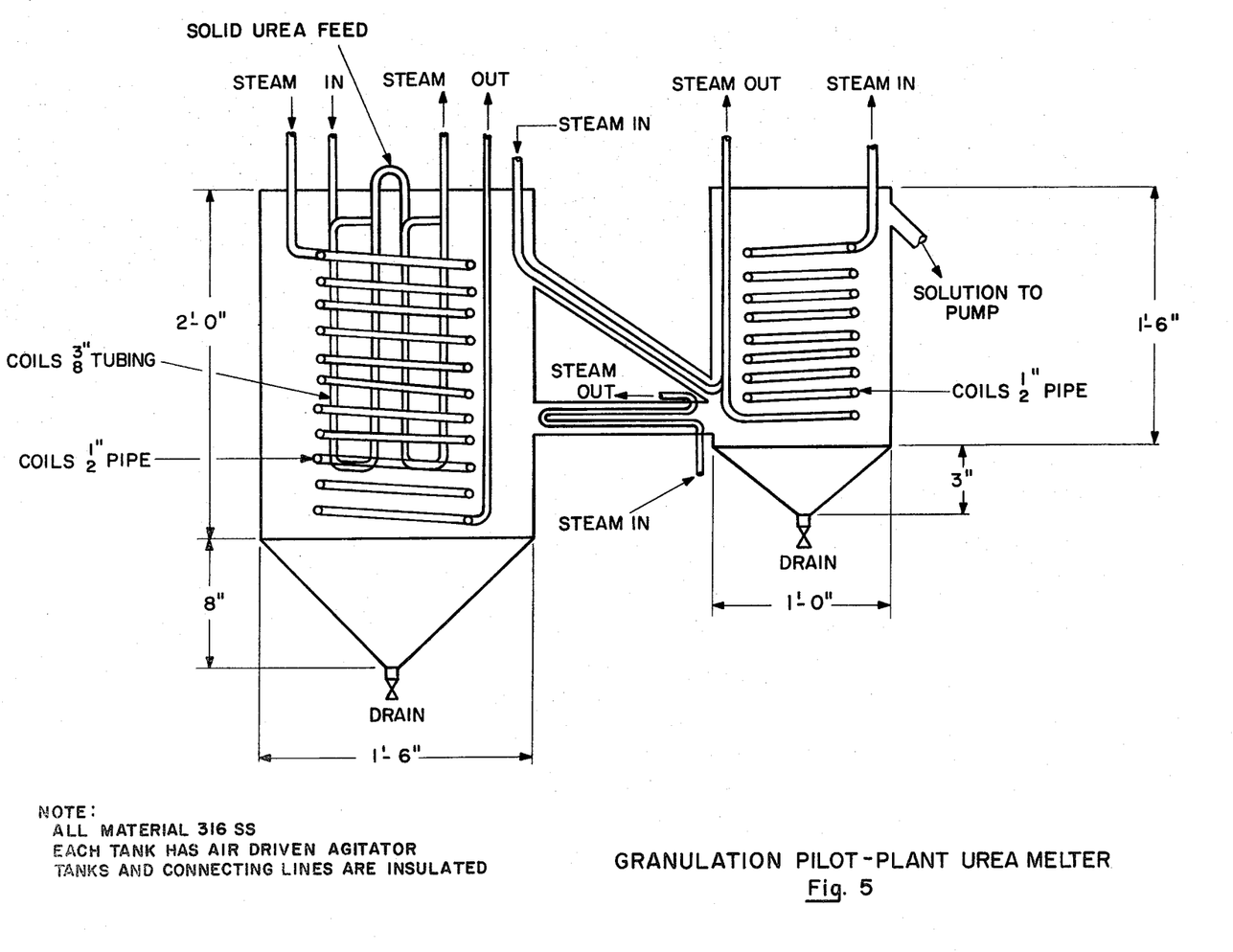
FIG. 5 shows a sketch of the urea melters used when urea-ammonium phosphate sulfate materials are made by feeding a highly concentrated urea solution or melt to the granulator or to the pipe-cross reactor.

Referring more specifically to FIGS. 3 and 4, the pipe-cross reaction chamber consists of a length of suitably corrosion-resistant pipe preceded by a standard pipe-cross or other similar means for simultaneously feeding ammonia, phosphoric acid, and sulfuric acid into the reaction chamber. We have found that a 1½-inch-diameter reaction tube (nominal) is of sufficient size to produce at least 1000 pounds per hour of molten ammonium phosphate sulfate.

The actual melt (or slurry) rates thus far obtained using the 1½ inch reaction tube have ranged from 139 to 549 pounds per hour per square inch of inside cross-sectional area of flow (284 to 1120 pounds per hour of melt or slurry). The ¾-inch reaction tube has been used at rates of up to 1787 pounds per hour per square inch of inside cross-sectional area of flow (954 pounds per hour) when producing an 18-46-0 grade ammonium phosphate sulfate. The reaction tube pipe length to diameter ratios (actual inside diameter) in the range of 6:1 to 100:1 are suitable. The only pressure requirement for operation of the pipe-cross reactor is the normal back pressure needed to cause viscous fluid (melt or highly concentrated solution) to flow through a pipe and give an acceptable distribution onto the granulator bed of solids.

In order that those skilled in the art may better understand how the present invention can be practiced, the following examples of the production of monoammonium phosphate sulfate, diammonium phosphate sulfate, and NPK grades of granular fertilizers containing these ammonium phosphate sulfates are given by way of illustration but not necessarily by way of limitation.

EXAMPLE I

In the first series of pilot-plant tests of our process, a pipe-cross reactor with a 1½-inch reaction tube of Hastelloy C-276 pipe was made and installed in the ammoniator-granulator so the discharge of the pipe-cross reactor would be distributed onto the top of the bed of rotating materials. The pipe-cross reactor discharged onto the bed of rotating materials approximately one-third of the distance from the feed end of the ammoniator-granulator to the discharge end and centered on the bed transversely.

In our first four tests of the pipe-cross reactor, all the sulfuric acid and phosphoric acid were fed to the pipe-cross reactor to produce a 12-48-0 grade ammonium phosphate sulfate material. The gaseous ammonia fed to the pipe-cross reactor was proportioned to fully ammoniate all the sulfuric acid and to ammoniate the phosphoric acid to an $NH_3:H_3PO_4$ mole ratio of 1.0. It was desired to ammoniate the phosphoric acid to an $NH_3:H_3PO_4$ mole ratio of 1.0, but the chemical analysis showed that the ratio was lower in the tests than had been desired. The production rate was 1000 pounds per hour. The pipe-cross reactor started up smoothly and operated very well for four tests. There was very little buildup in the pipe-cross reactor during the tests. Recycle ratios were less than 3 during all tests and the process and material produced seemed stable for recycle ratios of 1 to 3; however, the products produced in all the tests were very rough and irregular in appearance, so in later tests, part of the phosphoric acid and ammonia were added to the rolling bed of materials in the ammoniator-granulator. The percentage of the phosphoric acid that was fed to the rolling bed of material in the ammoniator-granulator was varied from 20 to 40 percent of the total phosphoric acid fed to the process. Although all the ratios performed well, the best operation was obtained when 35 percent of the total phosphoric acid fed to the process was introduced to the rolling bed of material in the ammoniator-granulator. In early tests of adding some of the phosphoric acid and ammonia to the above rolling bed, a higher recycle ratio was needed; however, substantial improvements were made in later tests by improving the distribution of the phosphoric acid so that recycle ratios of 4 and less are now used.

The feed rates and operating data obtained during two typical tests of the above-mentioned processes for producing 12-48-0 grade ammonium phosphate sulfate are summarized in Table I below. This table also shows the operating condition of the pipe-cross reactor and ammoniator-granulator.

Table I

| Production of Granular Fertilizer Using the Pipe-Cross Reactor | | |
|---|---|---|
| Nominal grade | 12-48-0 | 12-48-0 |
| Nominal production rate, tons/hr. | 0.5 | 0.5 |
| Test number | PCX-3 | PCX-25 |
| Duration of test, hrs. | | 6.0 |
| Feed rate, lbs./hr. | | |
| Pipe-cross reactor | | |
| Ammonia (gaseous) | 145 | 121 |
| Phosphoric acid | 880 | 646 |
| Sulfuric acid | 114 | 112 |
| Ammoniator-granulator | | |
| Ammonia (gaseous) | — | 29 |
| Phosphoric acid (51–54% $P_2O_5$) | — | 215 |
| Water | 80 | — |
| Pipe-cross reactor | | |
| Feed acid concentration | | |
| Phosphoric acid, %$P_2O_5$ | 52.8 | 53.2 |
| Sulfuric acid, %$H_2SO_4$ | 90.2 | 90.8 |

Table I-continued

| Production of Granular Fertilizer Using the Pipe-Cross Reactor | | |
|---|---|---|
| Nominal grade | 12-48-0 | 12-48-0 |
| Nominal production rate, tons/hr. | 0.5 | 0.5 |
| Test number | PCX-3 | PCX-25 |
| Reaction tube size, inches[a] | 1½ | 1½ |
| Temperature, °F | 402 | 446 |
| Feed temperature | | |
| Ammonia | 70 | 105 |
| Phosphoric acid | 149 | 160 |
| Sulfuric acid | 70 | 105 |
| Melt chem. anal. % by wt. | | |
| Total N | 11.1 | 11.2 |
| Total $P_2O_5$ | 48.4 | 47.0 |
| Polyphosphate $P_2O_5$ as % total $P_2O_5$ | 11.5 | 37.6 |
| Water (AOAC) | 0.8 | 0.7 |
| $SO_3$ | 12.5 | 13.4 |
| $NH_3:H_3PO_4$ mole ratio | 0.70 | 0.70 |
| Drum granulator | | |
| Temperature, °F | | |
| Recycle | 125 | 140 |
| Granulator product | 222 | 229 |
| Recycle ratio, lb./lb. product | 2.9 | 5.7 |
| Granulator Product screen anal. (Tyler),% | | |
| +6 | 25.2 | 3.6 |
| −6 +8 | 36.2 | 31.4 |
| −8 +10 | 24.0 | 32.6 |
| −10 +12 | 8.0 | 13.7 |
| −12 +16 | 4.9 | 13.3 |
| −16 | 1.7 | 5.4 |
| Screened product | | |
| Chemical analysis, % by wt. | | |
| Total N | 11.9 | 12.2 |
| Total $P_2O_5$ | 48.9 | 47.8 |
| Water (AOAC) | 1.4 | 0.7 |
| % of total $P_2O_5$ | | |
| Polyphosphate | 7.4 | 12.1 |
| Water soluble | 96.2 | 90.6 |
| Available | 98.2 | 100.0 |
| $SO_3$ | 11.1 | 11.4 |
| Screen analysis (Tyler),% | | |
| +6 | 3.5 | 0 |
| −6 +8 | 59.6 | 45.2 |
| −8 +10 | 34.3 | 44.8 |
| −10 +12 | 2.4 | 9.0 |
| −12 +16 | 0.2 | 0.8 |
| −16 | 0 | 0.2 |
| Bulk density, lb./ft.$^3$ | 53 | 51 |

[a]Size given is the nominal pipe size used in inches.

EXAMPLE II

During the first series of test using the pipe-cross reactor, potassium chloride was added along with the recycle in a monoammonium phosphate sulfate formulation to produce a 10-40-10 grade material. The operation of the granulation pilot plant with this process was very good. No severe problems were encountered in the 3.75 hour test. A recycle ratio of only 2.8 was required in this test. The pipe-cross reactor melt temperature was 435° F., and this gave a melt with a polyphosphate content of 15.8 percent of the total $P_2O_5$. There was no substantial buildup in the pipe-cross reactor during this test. The feed rates used in the above-mentioned test and the operating data obtained during the test are summarized in Table II below.

Table II

| Production of Granular Fertilizer Using the Pipe-Cross Reactor | |
|---|---|
| Nominal grade | 10-40-10 |
| Nominal production rate, tons/hr. | 0.5 |
| Test number | PCX-5 |
| Duration of test, hrs. | 3.75 |
| Feed rate, lb./hr. | |
| Pipe-cross reactor | |
| Ammonia (gaseous) | 124 |
| Phosphoric acid | 732 |
| Sulfuric acid | 95 |
| Ammoniator-granulator | |
| Potassium chloride | 162 |
| Water | 100 |
| Pipe-cross reactor | |

Table II-continued

| Production of Granular Fertilizer Using the Pipe-Cross Reactor | |
|---|---|
| Nominal grade | 10-40-10 |
| Nominal production rate, tons/hr. | 0.5 |
| Test number | PCX-5 |
| Feed $H_3PO_4$ concentration, % $P_2O_5$ | 52.6 |
| Feed $H_2SO_4$ concentration, % $H_2SO_4$ | 90.2 |
| Reactor tube size, in.[a] | 1-¼ |
| Temperature, °F | 435 |
| Feed temperature | |
| Ammonia | 73 |
| Phosphoric acid | 158 |
| Sulfuric acid | 73 |
| Melt, chemical analysis, % by wt. | |
| Total N | 11.9 |
| Total $P_2O_5$ | 48.1 |
| Polyphosphate $P_2O_5$, % of total $P_2O_5$ | 15.8 |
| Water (AOAC) | 0.4 |
| $SO_3$ | 12.6 |
| $NH_3$:$H_3PO_4$ mole ratio | 0.79 |
| Drum granulator | |
| Temperature, °F | |
| Recycle | 109 |
| Granulator product | 207 |
| Recycle ratio lb/lb product | 2.8 |
| Granulator product screen analysis (Tyler),% | |
| +6 | 11.8 |
| −6 +8 | 24.1 |
| −8 +10 | 26.6 |
| −10 +12 | 15.9 |
| −12 +16 | 14.8 |
| −16 | 6.8 |
| Screened product | |
| Chemical analysis, % by wt. | |
| Total N | 11.1 |
| Total $P_2O_5$ | 42.3 |
| $K_2O$ | 6.7 |
| Water (AOAC) | 1.8 |
| Percent of total $P_2O_5$ | |
| Polyphosphate | 6.9 |
| Water soluble | 94.1 |
| Available | 99.8 |
| $SO_3$ | 10.2 |
| Screen analysis (Tyler), % | |
| +6 | 3.7 |
| −6 +8 | 52.7 |
| −8 +10 | 40.1 |
| −10 +12 | 3.2 |
| −12 +16 | 0.2 |
| −16 | 0.1 |
| Bulk density, lb/ft$^3$ | 51 |

[a]Size given is the nominal pipe size used in inches. The 1¼-inch pipe has an outside diameter of 1.90 inch and an inside diameter of 1.61 inch.

EXAMPLE III

After the pipe-cross reactor had been used to produce both 12-48-0 and 10-40-0 grades of monoammonium phosphate sulfate, we tested other NPK grades of ammonium phosphate sulfate which required substantial changes in the method of operation to produce. A 13-13-13 grade material was produced by two processes. In one process, as typified by test PCX-6 in Table III, infra, all of the phosphoric and sulfuric acids were fed to the pipe-cross reactor, and ammonia was proportioned to neutralize all of the sulfuric acid and to produce a melt with an $NH_3$:$H_3PO_4$ mole ratio of about 1.0. The temperature of the pipe-cross reactor melt was 468° F. in test PCX-6 and the recycle ratio was 3.4. A product with a polyphosphate content of 29.2 of the total $P_2O_5$ was produced. In an effort to produce a smoother, more uniform product, half of the $P_2O_5$ (as $H_3PO_4$) was added to the rolling bed of material in the ammoniator-granulator, and ammonia was proportioned to produce a pipe-cross reactor with an $NH_3$:$H_3PO_4$ mole ratio of 1.0 and also to produce a granulator discharge product with an $NH_3$:$H_3PO_4$ mole ratio of 1.0. In test PCX-15, which was typical of this formulation, a recycle ratio of only 1.6 was required and the pipe-cross reactor melt temperature was 517° F. This was with a phosphoric acid concentration of only 35.3 percent $P_2O_5$ and represented a substantial improvement over the other methods that were mentioned previously. In both methods of operation, up to 500 pounds of sulfuric acid per ton of product was added to the pipe-cross reactor. This is substantially more than can be added to the process when not using the pipe-cross reactor. In both of the abovementioned tests, about 450 pounds of sulfuric acid per ton of product was fed to the pipe-cross reactor, as shown in Table III below.

Table III

| Production of Granular Fertilizer Using the Pipe-Cross Reactor | | |
|---|---|---|
| Nominal grade | 13-13-13 | 13-13-13 |
| Nominal production rate, tons/hr | 0.5 | 0.75 |
| Test number | PCX-6 | PCX-15 |
| Duration of test, hrs. | 5.28 | 5.58 |
| Feed rates, lbs/hr. | | |
| Pipe-cross reactor | | |
| Ammonia (gaseous) | 110 | 138 |
| Phosphoric acid | 308 | 296 |
| Sulfuric acid | 223 | 370 |
| Ammoniator-granulator | | |
| Ammonia (gaseous) | — | 24 |
| Phosphoric acid (51–54% $P_2O_5$) | — | 180 |
| Potassium chloride | 207 | 325 |
| Ammonium sulfate | — | 320 |
| Water | 60 | — |
| Pipe-cross reactor | | |
| Feed $H_3PO_4$ concentration, % $P_2O_5$ | 47.8 | 35.3 |
| Feed $H_2SO_4$ concentration, % $H_2SO_4$ | 90.2 | 90.3 |
| Reactor tube size, in.[a] | 1-¼ | 1-¼ |
| Temperature, °F | 468 | 517 |
| Feed temperature | | |
| Ammonia | 72 | 66 |
| Phosphoric acid | 156 | 137 |
| Sulfuric acid | 72 | 66 |
| Melt, chemical analysis, % by wt. | | |
| Total N | 14.7 | 15.4 |
| Total $P_2O_5$ | 26.9 | 17.4 |
| Polyphosphate $P_2O_5$ as % total $P_2O_5$ | 58.0 | 51.0 |
| Water (AOAC) | 0.3 | 0.3 |
| $SO_3$ | 34.2 | 45.7 |
| Drum granulator | | |
| Temperature, °F | | |
| Recycle | 102 | 97 |
| Granulator product | 189 | 234 |
| Recycle ratio, lb/lb product | 3.4 | 1.6 |
| Granulator product, screen analysis (Tyler)% | | |
| +6 | 11.8 | 51.6 |
| −6 +8 | 24.1 | 27.6 |
| −8 +10 | 26.6 | 12.4 |
| −10 +12 | 15.9 | 4.2 |
| −12 +16 | 14.8 | 3.0 |
| −16 | 6.8 | 1.2 |
| Screened product | | |
| Chemical Analysis, % by wt. | | |
| Total N | 13.6 | 14.0 |
| Total $P_2O_5$ | 15.4 | 13.7 |
| $K_2O$ | 13.0 | 13.8 |
| Water (AOAC) | 1.3 | 1.1 |
| Percent of total $P_2O_5$ | | |
| Polyphosphate | 29.2 | 27.0 |
| Water soluble | 93.5 | 95.6 |
| Available | 100 | 98.5 |
| $SO_3$ | 30.5 | 31.4 |
| Screen analysis (Tyler), % | | |
| +6 | 6.1 | 0.2 |
| −6 +8 | 60.4 | 19.4 |
| −8 +10 | 31.7 | 65.7 |
| −10 +12 | 1.3 | 13.9 |
| −12 +16 | 0.1 | 0.6 |
| −16 | 0.4 | 0.2 |
| Bulk density, lb/ft$^3$ | 56 | 58 |

[a]Size given is the nominal pipe size used in inches. The 1-¼-inch pipe has an outside diameter of 1.90 inch, and an inside diameter of 1.61 inch.

EXAMPLE IV

After the previously mentioned grades were produced, another series of tests was begun to produce an NPK monoammonium phosphate sulfate with a 6-24-24 grade. This grade was made after only a few process modifications, since the pipe-cross reactor was operated as with 12-48-0 grades and enough potassium chloride was metered to the recycle to produce a product with a 6-24-24 grade. The pipe-cross reactor melts produced had temperatures of 415° F. to 470° F. and polyphosphate contents of 11.9 to 29.5 percent of the total $P_2O_5$. In one group of tests, as typified by test PCX-12 in Table IV infra, all of the phosphoric and sulfuric acids were fed to the pipe-cross reactor to produce a melt with an $NH_3:H_3PO_4$ mole ratio of about 1.0. In the other group of tests, 40 percent of the phosphoric acid was fed to the rolling bed of material in the ammoniator-granulator along with enough ammonia to neutralize the phosphoric acid to an $NH_3:H_3PO_4$ mole ratio of 1.0. Table IV below is a summary of the feed rates and operating data obtained in two typical tests.

Table IV

| Production of Granular Fertilizer Using the Pipe-Cross Reactor | | |
|---|---|---|
| Nominal grade | 6-24-24 | 6-24-24 |
| Nominal production rate, tons/hr. | 1.0 | 1.0 |
| Test number | PCX-12 | PCX-17 |
| Duration of test, hr. | 4.58 | 5.00 |
| Feed rates, lbs./hr. | | |
| Pipe-cross reactor | | |
| Ammonia (gaseous) | 138 | 95 |
| Phosphoric acid | 797 | 510 |
| Sulfuric acid | 380 | 94 |
| Ammoniator-granulator | | |
| Ammonia (gaseous) | 13 | 52 |
| Phosphoric acid (51–54 % $P_2O_5$) | — | 350 |
| Potassium chloride | 791 | 800 |
| Normal superphosphate | 240 | 185 |
| Water | 201 | 115 |
| Pipe-cross reactor | | |
| Feed $H_3PO_4$ concentration, % $P_2O_5$ | 52.9 | 53.4 |
| Feed $H_2SO_4$ concentration, % $H_2SO_4$ | 92.0 | 90.2 |
| Reactor tube size, in.[a] | 1-½ | 1-½ |
| Temperature, ° F | 444 | 436 |
| Feed temperature | | |
| Ammonia | 72 | 68 |
| Phosphoric acid | 158 | 158 |
| Sulfuric acid | 72 | 68 |
| Pipe-cross reactor | | |
| Melt, chemical analysis % by wt. | | |
| Total N | 12.0 | 13.0 |
| Total $P_2O_5$ | 48.3 | 45.8 |
| Polyphosphate $P_2O_5$ as % total $P_2O_5$ | 11.9 | 24.0 |
| Water (AOAC) | 0.3 | 0.2 |
| $SO_3$ | 10.7 | 15.3 |
| $NH_3:H_3PO_4$ mole ratio | 0.87 | 0.85 |
| Drum granulator | | |
| Temperature, ° F | | |
| Recycle | 90 | 96 |
| Granulator product | 213 | 209 |
| Recycle ratio, lb./lb. product | 1.2 | 1.6 |
| Granulator product screen anal. (Tyler), % | | |
| +6 | 38.1 | 17.8 |
| −6 +8 | 15.2 | 23.4 |
| −8 +10 | 16.7 | 25.0 |
| −10 +12 | 13.3 | 14.1 |
| −12 +16 | 11.1 | 14.0 |
| −16 | 5.6 | 5.7 |
| Screened product | | |
| Chemical analysis % by wt. | | |
| Total N | 6.3 | 6.6 |
| Total $P_2O_5$ | 24.6 | 25.0 |
| $K_2O$ | 23.4 | 25.4 |
| Water (AOAC) | 3.1 | 1.7 |
| Percent of total $P_2O_5$ | | |
| Polyphosphate | 9.8 | 14.0 |
| Water soluble | 89.4 | 90.0 |
| Available | 100 | 100 |
| $SO_3$ | 9.2 | 8.0 |
| Screen analysis (Tyler), % | | |
| +6 | 2.0 | 0.2 |
| −6 +8 | 43.2 | 43.6 |
| −8 +10 | 48.1 | 30.8 |
| −10 +12 | 6.0 | 22.9 |
| −12 +16 | 0.6 | 2.3 |
| −16 | 0.1 | 0.2 |
| Bulk density lb./ft.[3] | 58 | 58 |

[a]Size given is the nominal pipe size used in inches. The 1-½-inch pipe has an outside diameter of 1.90 inch and an inside diameter of 1.61 inch.

EXAMPLE V

In one series of tests, an 18-46-0 diammonium phosphate sulfate material was produced. Initially, part of the phosphoric acid and ammonia was fed to the rolling bed of material in the ammoniator-granulator. Although a suitable product was made, close attention was required to maintain the good rolling action of the bed since there was a marked tendency for sections or areas of the bed to become too wet. Spreading the phosphoric acid and pipe-cross reactor slurry over as wide an area as possible on top of the rolling bed helped, but overwetting still occurred routinely. These tests were carried out with the pipe-cross reactor slurry at an $NH_3:H_3PO_4$ mole ratio of about 1.4 to 1.5. Additional gaseous ammonia was introduced into the rolling bed of materials through a submerged, drilled pipe sparger to produce an ammoniator-granulator discharge product with an $NH_3:H_3PO_4$ mole ratio of about 1.8 to 1.85. The overwetting was eliminated by feeding all the phosphoric and sulfuric acids to the pipe-cross reactor with enough ammonia to produce an $NH_3:H_3PO_4$ mole ratio of about 1.3 to 1.35 in the slurry discharged onto the rolling bed of materials. Additional ammonia to the bed increased the $NH_3:H_3PO_4$ mole ratio to 1.8 to 1.85. In addition, the ammonia evolved from the ammoniator-granulator was reduced to about half of its previous quantity. It was evident that the large quantity of ammonia required to further ammoniate the slurry and to ammoniate the phosphoric acid introduced to the bed to diammonium phosphate could not be effective to neutralize the slurry and acid without large quantities being evolved in the ammoniator-granulator exhaust stream. Flow rates and operating data for a typical test, PCX-28, are shown in Table V below. Granulation was excellent in this series of tests as noted by the 86.7 percent of granulator discharge product that was minus 6 plus 10 mesh.

Table V

| Production of Granular Fertilizer Using the Pipe-Cross Reactor | |
|---|---|
| Nominal grade | 18-46-0 |
| Nominal production rate, tons/hr. | 0.38 |
| Test number | PCX-28 |
| Duration of test, hr. | 4.67 |
| Feed rates, lbs./hr. | |
| Pipe-cross reactor | |
| Ammonia (gaseous) | 108 |
| Phosphoric acid | 776 |
| Sulfuric acid | 37 |
| Ammoniator-granulator | |
| Ammonia (gaseous) | 62 |
| Phosphoric acid (51–54% $P_2O_5$) | 65 |
| Pipe-cross reactor | |
| Feed $H_3PO_4$ concentration, % $P_2O_5$ | 40.7 |
| Feed $H_2SO_4$ concentration, % $H_2SO_4$ | 91.6 |
| Reactor tube size, in.[a] | ½ |
| Temperature, ° F | 265 |
| Feed temperature | |
| Ammonia | 91 |
| Phosphoric acid | 153 |
| Sulfuric acid | 91 |
| Slurry chemical analysis, % by wt. | |
| Total N | 13.7 |
| Total $P_2O_5$ | 43.5 |
| Polyphosphate $P_2O_5$ as % total $P_2O_5$ | 2.1 |
| Water (AOAC) | 11.5 |
| $SO_3$ | 6.2 |
| $NH_3:H_3PO_4$ mole ratio | 1.34 |
| Drum granulator | |
| Temperature, ° F | |
| Recycle | 113 |
| Granulator product | 190 |
| Recycle ratio lb./lb. product | 6.6 |
| Granulator product screen anal. (Tyler), % | |
| +6 | 4.4 |
| −6 +8 | 59.6 |
| −8 +10 | 27.1 |
| −10 +12 | 5.4 |
| −12 +16 | 3.1 |
| −16 | 0.4 |
| Screened product | |
| Chemical analysis, % by wt. | |
| Total N | 17.8 |
| Total $P_2O_5$ | 45.5 |
| Water (AOAC) | 2.5 |

Table V-continued

| Production of Granular Fertilizer Using the Pipe-Cross Reactor | |
|---|---|
| Nominal grade | 18-46-0 |
| Nominal production rate, tons/hr. | 0.38 |
| Test number | PCX-28 |
| Percent of total $P_2O_5$ | |
| Polyphosphate | 1.1 |
| Water soluble | 87.9 |
| Available | 98.9 |
| $SO_3$ | 5.6 |
| Screen analysis (Tyler) % | |
| +6 | 0 |
| −6 +8 | 59.6 |
| −8 +10 | 35.7 |
| −10 +12 | 4.4 |
| −12 +16 | 0.3 |
| −16 | 0 |
| Bulk density lb./ft.$^3$ | 53 |

[a]Size given is the nominal pipe size used in inches. The 1-inch pipe has an outside diameter of 1.05 inch, and an inside diameter of 0.824 inch.

EXAMPLE VI

Although monoammonium phosphate had been produced in a pipe-cross reactor without the addition of sulfuric acid, diammonium phosphate had not; so during the series of tests in previous Example V toward the end of test PCX-39, the flow of sulfuric acid (about 90 pounds per ton of product) to the pipe-cross reactor was shut off. After only 12 minutes of operation, two of the three holes in the drilled-pipe slurry distributor were closed off by solids buildup, and the back pressure on the feedlines to the pipe-cross reactor had increased significantly. This indicated that under conditions of the test, sulfuric acid was needed for the best operation of the pipe-cross reactor. During most of test PCX-47 in which a different source of phosphoric acid was fed, sulfuric acid was not fed to the pipe-cross reactor. Although the back pressure on the feeds increased more quickly, scale buildup was not significantly greater than that in other tests when sulfuric acid was fed to the pipe-cross reactor. During the last 30 minutes of the test, sulfuric acid was fed to the pipe-cross reactor to determine if the sulfuric acid would clean the reaction tube once a buildup had occurred. The addition of the sulfuric acid had no effect on reducing the buildup in the pipe-cross reactor as evidenced by the back pressure on the feeds remaining high rather than decreasing as would have occurred if the buildup in the pipe-cross reactor had been reduced. The tests indicate that with some phosphoric acids, the pipe-cross reactor will operate well without feeding sulfuric acid; however, in other cases, some sulfuric acid feed is necessary. So the addition of sulfuric acid to the pipe-cross reactor at the best conditions does not have an effect on the operation, and at worst conditions, it is necessary for operation. Whether sulfuric acid would be needed would be decided by the particular phosphoric acid which is available.

EXAMPLE VIII

After the previously mentioned grades had been produced in the granulation pilot plant using the common pipe-cross reactor, we began work to produce a 33-11-0 grade material using urea as one of the nitrogen sources. It was desired to produce a 33-11-0 grade material that contained 5 percent sulfur with all the sulfur obtained from sulfuric acid fed to the process. We began the tests by feeding gaseous ammonia to the pipe-cross reactor and controlling the melt temperature to about 500° F. as in previous tests feeding large quantities of sulfuric acid to the pipe-cross reactor. However, this formulation could not be satisfactorily produced for a long period of time because buildup occurred rapidly in the pipe-cross reactor tube with the high rate of sulfuric acid. The ammonia evolved from the ammoniator-granulator was very high (more than 20 percent of the total ammonia fed to the process), and the high temperature of the melt caused considerable overwetting in the ammoniator-granulator. The formulation was changed to give a product with either 3 or 4 percent sulfur. Both of these have been tested in numerous tests, and a typical set of data for feed rates and operating conditions for one of these tests (PCU-11) is given in Table VI infra. During these tests we found that lower temperatures of 250° to 300° F. resulted in better pipe-cross reactor operation with less buildup. At these lower temperatures, the pipe-cross reactor melt contained more water, but with careful operation, a product with less than 1.0 percent water (AOAC method) could be produced that would have good storage properties. To produce a material with 5 percent sulfur, we tested a formulation in which one-half of the sulfur was furnished by sulfuric acid fed to the pipe-cross reactor and one-half by solid ammonium sulfate fed to the recycle stream. Typical feed rates and operating data for this formulation are shown in Table VI (test PCU-30) infra.

We also ran a series of tests to produce a 33-11-0-3S grade material in which we proportioned the ammonia to neutralize the sulfuric acid and the phosphoric acid in the pipe-cross reactor to an $NH_3:H_3PO_4$ mole ratio of about 0.6. Additional ammonia was added to the rolling bed of material in the ammoniator-granulator to give a product with an $NH_3:H_3PO_4$ mole ratio of about 1.0. This gave much improved operation over the other formulations tested in that granulation was more uniform with less tendency for the rolling bed of material to become too wet, ammonia evolution from the ammoniator-granulator was lower, a lower recycle was generally required, and buildup in the pipe-cross reactor was less severe. Typical operating conditions and flow rates for this method of operation are shown in Table VI (test PCU-28) below.

Table VI

| Production of Granular Fertilizer Using the Pipe-Cross Reactor | | | |
|---|---|---|---|
| Nominal grade | 33-11-0 | 33-11-0 | 33-11-0 |
| Nominal production rate, ton/hr. | 0.5 | 0.5 | 0.5 |
| Test number | PCU-28 | PCU-30 | PCU-11 |
| Duration of test, hr. | 5.1 | 5.12 | 4.5 |
| Feed rates, lbs./hr. | | | |
| Pipe-cross reactor | | | |
| Ammonia (gaseous) | 48 | 43 | 64 |
| Phosphoric acid | 284 | 218 | 174 |
| Sulfuric acid | 100 | 84 | 108 |
| Ammoniator-granulator | | | |
| Ammonia (gaseous) | 14 | 10 | — |
| Urea | 630 | 578 | 607 |

Table VI-continued
Production of Granular Fertilizer Using the Pipe-Cross Reactor

| | | | |
|---|---|---|---|
| Nominal grade | 33-11-0 | 33-11-0 | 33-11-0 |
| Nominal production rate, ton/hr. | 0.5 | 0.5 | 0.5 |
| Test number | PCU-28 | PCU-30 | PCU-11 |
| Ammonium sulfate | — | 103 | — |
| Pipe-cross reactor | | | |
| Feed $H_3PO_4$ concentration, % $P_2O_5$ | 36.0 | 39.7 | 47.8 |
| Feed $H_2SO_4$ concentration, % $H_2SO_4$ | 92.6 | 92.6 | 90.5 |
| Reactor tube size, in.[a] | ¾ | ¾ | 1-¼ |
| Temperature, °F | 264 | 269 | 520 |
| Feed temperature | | | |
| Ammonia | 69 | 74 | |
| Phosphoric acid | 150 | 152 | 150 |
| Sulfuric acid | 69 | 74 | |
| Slurry, chemical analysis, % by wt. | | | |
| Total N | 12.9 | 11.3 | 14.5 |
| Total $P_2O_5$ | 31.6 | 36.6 | 32.5 |
| Polyphosphate $P_2O_5$ as % total $P_2O_5$ | 5.1 | 4.1 | 74.8 |
| Water (AOAC) | 3.1 | 2.2 | 0.59 |
| $SO_3$ | 27.9 | 22.8 | 26.7 |
| $NH_3:H_3PO_4$ mole ratio | 0.50 | 0.46 | 0.80 |
| Drum granulator | | | |
| Temperature, °F | | | |
| Recycle | 115 | 113 | 121 |
| Granulator product | 171 | 170 | 174 |
| Recycle ratio, lb./lb. product | 4.2 | 3.8 | 5.3 |
| Granulator product screen anal. (Tyler), % | | | |
| +6 | 18.4 | 23.5 | 14.3 |
| −6 +8 | 20.8 | 15.8 | 21.2 |
| −8 +10 | 22.3 | 16.1 | 19.8 |
| −10 +12 | 13.3 | 12.9 | 10.6 |
| −12 +16 | 15.6 | 16.7 | 14.0 |
| −16 | 9.6 | 15.0 | 20.1 |
| Screen product | | | |
| Chemical analysis, % by wt. | | | |
| Total N | 35.1 | 33.9 | 35.5 |
| Total $P_2O_5$ | 11.8 | 11.5 | 10.7 |
| Water (AOAC) | 0.9 | 0.9 | 0.4 |
| Percent of total $P_2O_5$ | | | |
| Polyphosphate | 5.5 | 10.9 | 68.2 |
| Water soluble | 95.8 | 91.3 | 100 |
| Available | 100 | 97.4 | 100 |
| $SO_3$ | 11.9 | 14.0 | 9.8 |
| Screen analysis (Tyler) % | | | |
| +6 | 0 | 0 | 0 |
| −6 +8 | 47.5 | 44.6 | 41.3 |
| −8 +10 | 40.7 | 46.1 | 33.5 |
| −10 +12 | 10.6 | 8.8 | 12.2 |
| −12 +16 | 1.0 | 0.2 | 9.3 |
| −16 | 0.2 | 0.3 | 3.4 |
| Bulk density lb./ft.³ | 48 | 46 | 48 |

[a]Size given is the nominal pipe size used in inches. The ¾-inch pipe has an outside diameter of 1.05 inch and an inside diameter of 0.824 inch.

EXAMPLE IX

Physical property tests were made of some of the minus 6- plus 10-mesh ammonium phosphate sulfate products produced in tests PCX-3 and PCX-4. Following is a summary of the properties of the 12-48-0-4S grade.

General Appearance: The granules were hard and evenly sized, but they were angular and rough in texture. There was some agglomeration of small particles to form popcorn-like clusters.

Hardness: The granule hardness of the minus 7- plus 8-mesh fraction was 5.6 pounds. This compares with between 5 and 6 pounds for pan granulated urea containing formaldehyde and 6 to 12 pounds for conventional commercial diammonium phosphates.

Bulk Density: Loose-pour bulk density was 58.5 pounds per cubic foot, and tapped bulk density was 61.5 pounds per cubic foot.

Abrasion Shatter Resistance: Breakdown in the standard abrasion and shatter test (as given in TVA Special Report Number S-444) was only 0.1 percent for the ammonium phosphate sulfate product, as compared with 0.7 percent for typical conventional commercial diammonium phosphate.

Critical Humidity: The critical relative humidity of the 12-48-0-4S was between 65 and 70 percent, which is essentially the same as for conventional commercial diammonium phosphate.

Figure 6:
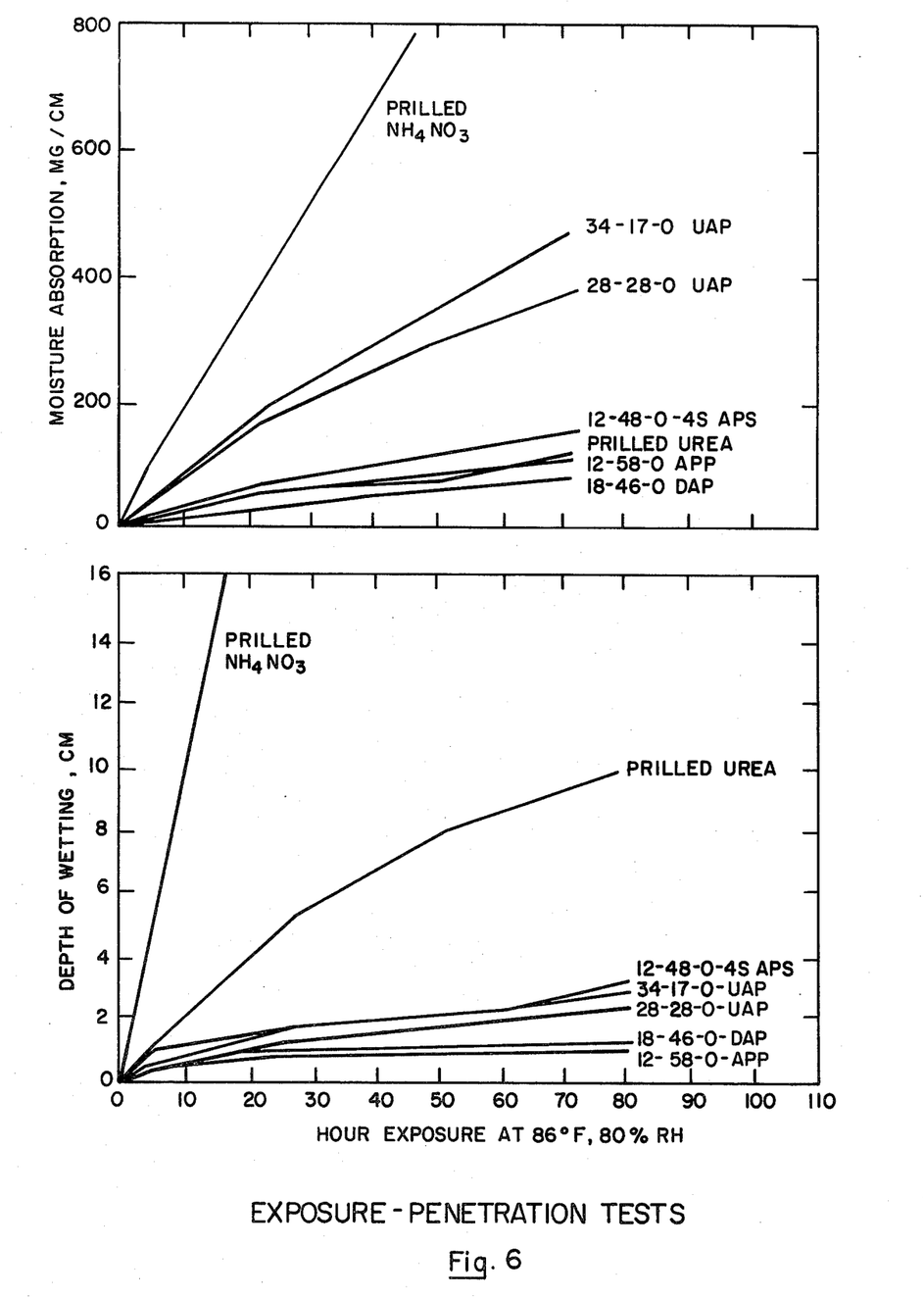
FIG. 6 compares exposure penetration characteristics of various materials and is more fully discussed in Example IX, infra.

Exposure Penetration: Standard laboratory test results are shown in FIG. 6, together with data from similar tests of commercial prilled ammonium nitrate, prilled urea, conventional diammonium phosphate, urea-ammonium phosphate (UAP), and 12-58-0 grade ammonium polyphosphate (APP). The rate of moisture absorption and moisture-retention capacity of the 12-48-0-4S ammonium phosphate sulfate compares favorably with that of diammonium phosphate and ammonium polyphosphate which store very well.

Bag-Storage Tests: After four months of storage in bags, the unconditioned pilot-plant 12-48-0-4S grade ammonium phosphate sulfate, with an initial moisture content of 0.5 to 1.4 percent (AOAC), was in excellent condition with no bag set or lumps. Storage was in a 12-bag-high stack; the bottom four bags of this stack were inspected. The bags were five-ply paper with an inner spray coating of polyethylene. Storage was at ambient conditions.

Hydrolysis: Hydrolysis during the four months of storage resulted in a decrease in polyphosphate level from 7.4 to 6 percent.

EXAMPLE X

Several tests have been carried out in the granulation pilot plant to define the variable limits for producing 33-11-0-4S grade urea-ammonium phosphate sulfate using the common pipe-cross reactor. Storage tests were made of product from three different tests. A summary of the results of the tests follows. The moisture of these products was 0.4 to 0.7 percent water (AOAC vacuum desiccator method).

General Appearance: The granules were generally fairly well rounded; however, some were agglomerates of fine particles.

Particle size: The particle-size distribution of product from runs PCU-11 and −13 well matched that of typical granular wet-process commercial diammonium phosphate (DAP). However, particle size of product from run PCU-6 was somewhat larger than that of typical DAP; maximum divergence was 25 percentage points.

Hardness, Bulk Density, and Abrasion-Shatter Resistance: The granule hardness of the minus 7- plus 8-mesh fraction was about 5 to 8 pounds. This compares with 5 to 6 pounds for pan granulated urea containing formaldehyde and 6 to 12 pounds for commercial DAP. Loose-pour bulk density was about 46.5 pounds per cubic foot and tapped density was about 50.0 pounds per cubic foot. Breakdown in the standard abrasion shatter test was about 1.0 percent, as compared with about 0.7 percent for typical commercial DAP.

Figure 7:
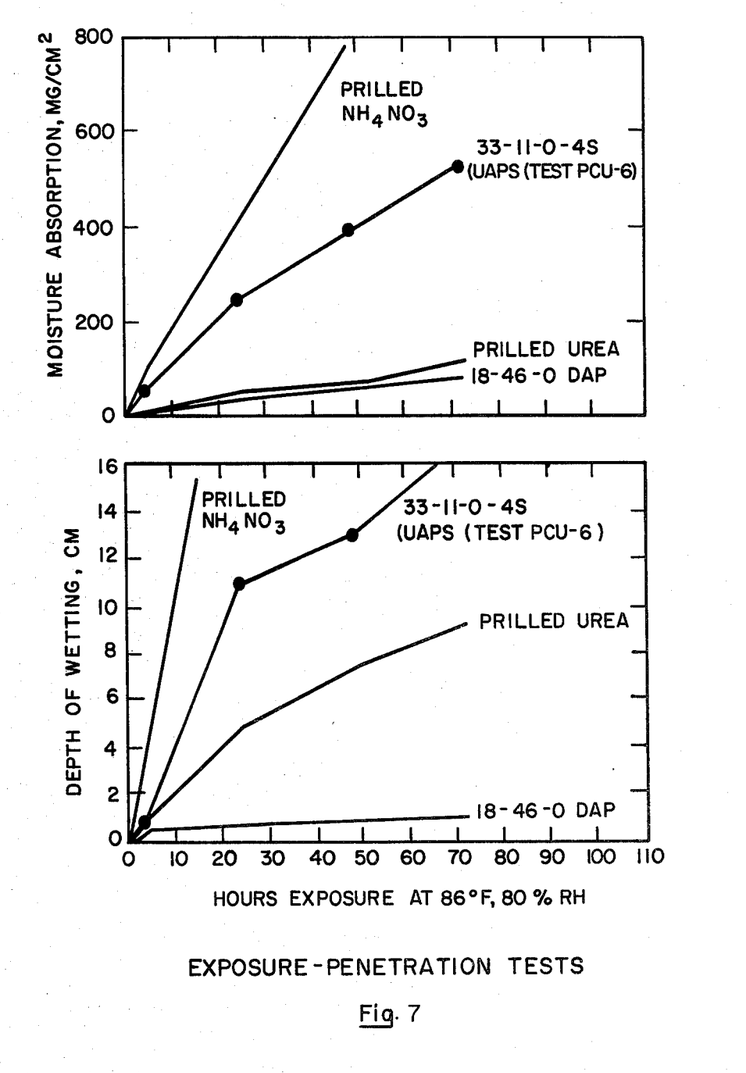
FIG. 7 compares exposure penetration characteristics of various materials and is more fully discussed in Example X, infra.

Critical Humidity and Exposure-Penetration Characteristics: The critical relative humidity of the UAPS was determined to be 55 to 60 percent at 86° F. This compares with 59 percent for ammonium nitrate, 75 percent for urea, and 55 to 60 percent for urea-ammonium phosphates of 35-17-0 or 28-28-0 grade. Results of standard laboratory exposure-penetration tests are presented in FIG. 7, together with data from similar tests with commercial prilled ammonium nitrate, prilled urea, and conventional diammonium phosphate. As the data show, the urea-ammonium phosphate sulfate (UAPS) was very hygroscopic and absorbed moisture at a rate intermediate between that of ammonium nitrate and urea. Moisture penetrated into the bulk material at a rate which approached that for ammonium nitrate, a product that must be protected from humid exposure.

Bag-Storage Tests: Bag-storage tests of products from three periods of operation were made to determine caking tendency. Small-bag (3-pound) tests were made at both ambient and controlled 90° F. temperatures. The bags were two-ply paper with an inner liner of 1-mil polyethylene; a heat-sealed overbag of 4-mil polyethylene was used for additional moisture protection. Applied pressure (3.7 psi) was equivalent to that under a 20-bag stack of 50-pound bags. Parallel tests were made in regular 50-pound plant urea bags which are of 7-mil polyethylene monofilm construction with valve-type fill; storage of these bags was at ambient temperature (May to October of 1976) under 3.7 psi pressure.

After the first 3 months of storage in bags, all the unconditioned pilot-plant products were in good physical condition; caking was none to only 3 percent of light lumps. After an additional 3 months (total 6 months), the highest moisture product (0.7 percent AOAC $H_2O$) was caked to a degree of 11 percent of medium hard lumps. A conditioning treatment of 1 to 2 percent of kaolin or attapulgite clay prevented caking however. Low-moisture product (0.4 percent AOAC $H_2O$) was in good condition after 6 months of storage in bags even without conditioner treatment.

Bulk-Storage Tests: After 1 to 3 months (May to September of 1976) of exposure to ambient warehouse conditions, wetting was to a depth of about 6 inches; the surface granules were very wet and became mud when handled. After an additional 3 months (total 6 months), penetration had progressed to 9 inches. It is evident, from the results of these tests, that this product must be afforded about the same protection from humid exposure as that required for ammonium nitrate. Additional bulk-storage tests are in progress in which commercial ammonium nitrate is being exposed in direct comparison with the 33-11-0-4S UAPS.

After sifting and winnowing through the data supra, as well as other results of tests and operation of our new, novel, and improved method of production of ammonium phosphates and ammonium phosphate sulfates, we now present the acceptable and preferred parameters and variables as shown below.

| Variables | Limits | Preferred |
|---|---|---|
| Feed acids | | |
| $H_3PO_4$ | | |
| $P_2O_5$ content, percent by weight | 30–60 | 42–52 |
| Free $H_2O$, percent by weight | 0.1–55 | 15–30 |
| Temperature, °F | 35-boiling | 60–150 |
| $H_2SO_4$ | | |
| $H_2SO_4$, percent by weight | 78–98 | 93 |
| Temperature, °F | 10–150 | 60 |
| Pipe-cross reactor | | |
| $NH_3:H_3PO_4$ mole ratio | 0.4–1.7 | 0.6–1.5 |
| Temperature, °F | 200–550 | 250–500 |
| Percent of total free water evaporated from reactants | 20–100 | 90–100 |
| Retention time, minutes | 0.001–2 | 0.05–0.5 |
| Polyphosphate $P_2O_5$ | | |
| Percent of total $P_2O_5$ | 0.0–75 | 5–25 |
| Granulator | | |
| Temperature, °F | | |
| Recycle feed | 70–200 | 100–150 |
| Granulator discharge | 150–300 | 160–230 |
| Pounds of recycle per pound of melt | 0.5–10 | 1–4 |

The phosphoric acid used in the process may be of either the electric furnace type or of the wet-process type, or any mixtures thereof, and a wide range of concentrations may be used. Phosphoric acid of merchant-grade concentration (50–58 percent $P_2O_5$ for wet-process orthophosphoric acid and sulfuric acids of concentrations of 78 to 93 percent (60–66 percent Baume) may be used directly in the process. When phosphoric acids of lower concentration than 38 percent $P_2O_5$ and sulfuric acids of lower concentration than 78 percent (60 percent Baume) are used, then preheating of the feed acids before they are fed into the pipe-cross reactor may be required. If phosphoric acids containing less than about 15 percent free water are used, some predilution may be required to prevent formation of excessive amounts of polyphosphates during processing.

| Typical Grades Produced with Pipe-Cross Reactor | |
|---|---|
| Material | Grade |
| Monoammonium phosphate | 11-55-0 |
| Monoammonium phosphate sulfate | 12-48-0 |
| Monoammonium phosphate sulfate | 10-40-10 |
| Monoammonium phosphate sulfate | 6-24-24 |
| Monoammonium phosphate sulfate | 13-13-13 |
| Diammonium phosphate | 18-46-0 |
| Diammonium phosphate sulfate | 18-46-0 |
| Urea-ammonium phosphate sulfate | 33-11-0 |
| Urea-ammonium phosphate sulfate | 17-17-17 |

-continued

| Typical Grades Produced with Pipe-Cross Reactor | |
|---|---|
| Material | Grade |
| Urea-ammonium phosphate sulfate | 20-10-10 |

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by letters patent of the United States is:

1. An improved process for preparing granular substantially dust-free ammonium phosphate sulfates of a particle size distribution eminently suitable for subsequent bulk blending with other fertilizer values, which process consists essentially of simultaneously supplying a stream of anhydrous ammonia to the common pipe section of a pipe-cross reactor; simultaneously supplying a stream of phosphoric acid to the cross section of said pipe-cross reactor, said phosphoric acid having a $P_2O_5$ content in the range from about 30 to about 52 percent by weight and a free water content ranging from about 15 to 55 percent by weight; simultaneously supplying a stream of sulfuric acid to said cross section of said pipe-cross reactor, said sulfuric acid containing from about 78 to about 98 percent $H_2SO_4$, said streams of phosphoric acid and sulfuric acid contacting said anhydrous ammonia introduced into said common pipe section of said pipe-cross reactor at said cross section of said pipe-cross reactor, at a temperature sufficiently high so that additional water is not necessary for continuous operation; subsequently introducing the reaction product resulting from contacting said anhydrous ammonia, phosphoric acid, and sulfuric acid into the vapor tube extension of said pipe-cross reactor to ensure continued intimate contact therebetween; subsequently discharging from the downstream end of said vaporization tubular extension an essentially anhydrous molten ammonium phosphate sulfate into the upper end of an inclined rotating drum; therein maintaining a bed of rolling discrete particles of ammonium phosphate sulfate; withdrawing ammonium phosphate sulfate material from the lower end of said inclined rotating drum; introducing said withdrawn material into cooling means; withdrawing the resulting cooled material from said cooling means; introducing said material withdrawn from said cooling means into sizing means; returning particles of predetermined size from said sizing means into the upper end of said drum and withdrawing from said sizing means granular particles of ammonium phosphate sulfate as product; said process characterized by the fact that there is a reduction in moisture content ranging from about 0.1 to about 1.2 percent by weight of said ammonium phosphate sulfate by said step of removing same from the lower end of said inclined rotating drum to the step of recovery of same as product, said percent reduction in moisture content based on the moisture content of said ammonium phosphate sulfate as it leaves the lower end of said inclined rotating drum and caused by evaporation while said material is being cooled.

2. The process of claim 1 wherein the $NH_3:H_3PO_4$ mole ratio of the reaction product from the pipe-cross reactor is maintained at about 1, thereby producing a monoammonium phosphate sulfate containing up to about 30 percent of its $P_2O_5$ as polyphosphate.

3. The process of claim 1 for producing monoammonium phosphate sulfate wherein the $NH_3:H_3PO_4$ mole ratio of the reaction product from the pipe-cross reactor is maintained at about 0.6, and the $NH_3:H_3PO_4$ mole ratio of the material withdrawn from the lower end of said drum is adjusted to about 1 by continuously introducing anhydrous ammonia, in addition to that supplied to said pipe-cross reactor, beneath the surface of said bed in a broad stream substantially countercurrent to the upward movement of said rolling discrete particles therein, the breadth of said stream extending substantially the entire length of said bed.

4. The process of claim 1 wherein the $NH_3:H_3PO_4$ mole ratio of the ammonium phosphate sulfate material withdrawn from the lower end of said drum is maintained at about 1.9 by the additional step of continuously introducing anhydrous ammonia, in addition to that added to the cross section of said pipe-cross reactor, beneath the surface of said bed of rolling discrete particles in a broad stream substantially countercurrent to the upper movement of said particles, the breadth of said stream extending substantially the entire length of said bed.

5. The process of claim 1 wherein a urea-ammonium phosphate sulfate material is produced by means of the additional step of adding particulate solid urea together with the returned particles of predetermined size from said sizing means into the upper end of said drum.

6. The process of claim 1 wherein a urea ammonium phosphate sulfate material is produced by means of the additional step of adding either a concentrated urea solution or a substantially anhydrous urea melt, or both, onto the top surface of said bed of rolling discrete particles.

7. The process of claim 1 wherein a urea ammonium phosphate sulfate material is produced by means of the additional step of simultaneously supplying a stream of highly concentrated urea solution or a stream of substantially anhydrous urea melt, or both, to the stream of anhydrous ammonia fed to the cross section of said pipe-cross reactor.

8. The process of claim 1 wherein the phosphoric acids contain from about 42 to about 52 percent $P_2O_5$ by weight and from about 15 to about 30 percent free $H_2O$ by weight, and said sulfuric acid contains up to about 93 percent $H_2SO_4$ by weight.

* * * * *